Sept. 22, 1959      P. M. BOUNDS      2,905,104
DEVICE FOR MOUNTING AND FIXING A TRAILER ON A FLAT CAR
Filed July 29, 1957      2 Sheets-Sheet 1

INVENTOR
PERSHING M. BOUNDS

BY *Cushman, Darby & Cushman*
ATTORNEYS

Sept. 22, 1959  P. M. BOUNDS  2,905,104
DEVICE FOR MOUNTING AND FIXING A TRAILER ON A FLAT CAR
Filed July 29, 1957  2 Sheets-Sheet 2

INVENTOR
PERSHING M. BOUNDS
BY
Cushman, Darby & Cushman
ATTORNEYS

United States Patent Office 2,905,104
Patented Sept. 22, 1959

2,905,104

DEVICE FOR MOUNTING AND FIXING A TRAILER ON A FLAT CAR

Pershing M. Bounds, Shreveport, La.

Application July 29, 1957, Serial No. 674,843

8 Claims. (Cl. 105—159)

This application relates to the mounting of trailers on flat railroad cars and more particularly to an improved device detachably connectable to the tandem axles of a trailer for mounting and securing the trailer on a flat railroad car.

Due to the congestion on the nation's highways, the practice of transporting trailers of the type adapted to be hitched to tractors by the railroads has become increasingly important. In general, trailers of this type are provided with auxiliary wheels below the tandem axles of the same, which wheels are adapted to engage tracks on the flat railroad car to thereby facilitate the mounting of the trailer on the flat car and the rigid securement of the same thereon. Heretofore, the mounting of such auxiliary wheels on the trailer has been a rather time-consuming operation, requiring the securement of four separate wheel assemblies in various positions on the tandem axles of the trailer.

The present invention contemplates an improved device which may be readily attached to the tandem axles of a trailer by a relatively simple procedure so as to facilitate mounting of the trailer on a flat railroad car and its rigid securement thereon. In the more specific aspects of the present invention, the device includes improved axle-securing means arranged to accommodate a variety of different types of tandem axled trailers. Moreover, the device is so constructed that it may be attached to the tandem axles of the trailer without impairing the action of the axles when the trailer is being propelled by a tractor in its normal operation.

Accordingly, it is an object of the present invention to provide a device for attachment to the tandem rear axles of a trailer which may be readily secured in operative position with a minimum of time and effort.

Still another object of the present invention is the provision of a device of the type described having improved means for securing the same to tandem axles of varying sizes and shapes.

Still another object of the present invention is the provision of a device of the type described which is of unitary construction, but which, when attached to the tandem axles of a trailer, readily accommodates the independent movement of the tandem axles so that the trailer may be propelled in its normal manner by a tractor with the device attached thereto.

Still another object of the present invention is the provision of a device of the type described which is simple in construction, easy to operate and economical to manufacture and maintain.

These and other objects of the present invention will become more apparent during the course of the following detailed description and appended claims.

The invention may best be understood with reference to the accompanying drawings wherein an illustrative embodiment is shown.

Figure 1:
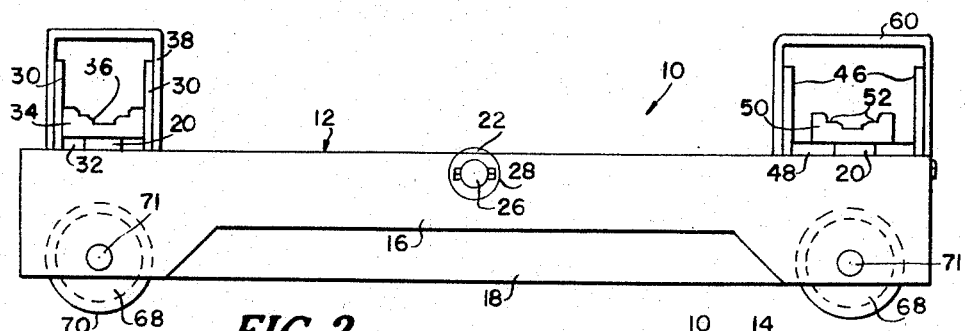
Figure 1 is a side elevational view of a device embodying the principles of the present invention.

Referring now more particularly to the drawings, there is shown a device, generally indicated at 10, embodying the principles of the present invention. The device comprises a pair of side frames 12 and 14 which, preferably, are of identical construction, each being a mirror image of the other. Each side frame includes a pair of transversely spaced, longitudinally extending, parallel, outer and inner side plates 16 and 18 rigidly interconnected by a plurality of longitudinally spaced, transversely extending cross bars 20. Each side frame also includes a transversely extending tube 22 having its outer end rigidly secured to the central upper portion of each of the associated side plates 16 and 18, by any suitable means, such as welding or the like, and its inner end directed inwardly beyond the associated inner side plate. A pair of triangular gusset plates 24 each having one of its legs rigidly secured, as by welding or the like, along one side of the portion of the tube extending inwardly from the inner side plate 18 and its other leg rigidly secured, as by welding or the like, to the adjacent upper portion of the side plate 18 is provided to reinforce and strengthen the associated tube 22.

The two side frames 12 and 14 are connected together for pivotal movement relative to each other about a horizontal transversely extending axis by a shaft 26 extending through the tube 22 of each side frame. Any suitable means, such as bolts 28, may be provided on the ends of the shaft to detachably secure the latter within the tubes 22.

In order to detachably secure the side frames to the tandem axles of a trailer, the front and rear ends of each side frame are provided with suitable clamp means. At the forward end of each side frame there is provided a fixed clamp means which includes a pair of longitudinally spaced upstanding lugs 30 rigidly secured to the inwardly facing surface of the side plate 18 adjacent the rear end thereof. A base plate 32 extends between the lugs 30 and has its ends rigidly secured to the respective lugs by any suitable means, such as by welding or the like. Rigidly mounted on the base plate 32, as by welding or the like, is an axle receiving block 34 having its upper surface provided with stepped notches 36 within which an axle is arranged to be seated. A U-shaped clamp member 38 is provided for cooperation with each pair of lugs 30 and has the free ends of its legs suitably apertured to receive a pin 40, which also extends through suitable apertures formed in the lugs 30. The pin may be retained in operative position within the apertures of the lugs and clamp member 38 by any suitable means, such as a locking pin 42, secured to the associated frame by a chain 44 welded or otherwise secured to the adjacent gusset plate 24.

The clamp means disposed on the forward end of each side frame is preferably of the adjustable type and includes a pair of longitudinally spaced upstanding lugs 46 rigidly secured, as by welding or the like, to the inwardly facing surface of the associated inner side plate 18 adjacent the forward end thereof. A base plate 48 extends between the lugs 46 and has its ends rigidly secured thereto, as by welding or the like. Mounted above the base plate 48 for longitudinal sliding movement with respect thereto is an axle-receiving block 50 having stepped notches 52 provided in the upper surface thereof within which an axle is adapted to seat. In order to provide movement of the block 50 into different positions of longitudinal adjustment relative to the base plate 48, a bolt 54 is rigidly secured to the central portion of the block and extends downwardly therefrom through a longitudinally extending slot 56 formed in the base plate 48. A nut 58 is threaded on the lower end of the bolt 54 and can be tightened to secure the block 50 in adjusted position relative to the plate 48. As before, a U-shaped clamp member 60 is provided for cooperation with the lugs 46 and has the free ends of its legs suitably apertured to receive a connecting pin 62, which also extends through suitable apertures formed in the lugs 46. Also as indicated previously, the connecting pin 68 may be secured in position by any suitable means, such as a locking pin 64, secured to the frame by a chain 66 rigidly secured to the associated gusset plate 24, as by welding or the like.

Disposed adjacent the clamp means at the forward and rearward ends of each side frame and between the side plates 16 and 18 thereof is a track engaging wheel 68. Each wheel is journaled for rotation about a transverse axis by means of a shaft or axle 71 suitably secured between the side plates 16 and 18, as by welding or the like. The wheels 68 are of conventional construction and, preferably, are flanged, as indicated at 70, adjacent their outer ends.

Disposed adjacent the rear end of each side frame and extending inwardly therefrom is a means for rigidly securing the device to a flat railroad car. Preferably, the means includes a pair of longitudinally spaced bent straps 72 and 74 having their free ends rigidly secured to the inwardly facing surfaces of the inner side plate 18, as by welding or the like. Extending longitudinally between each pair of bent straps 72 and 74 is a rigid hook engaging element 76 having a generally inverted T-shaped cross-sectional configuration, as best shown in Figure 4.

In addition to the connection of the side frames for pivotal movement about a horizontal transverse axis, the side frames are preferably also connected together by a connecting bar 78 extending between the rear ends of the side frames. To this end, the ends of the bar 78 are suitably apertured to loosely receive the pins 40 utilized to secure the U-shaped clamp member 38 to the lugs 30.

*Operation*

Figure 2:
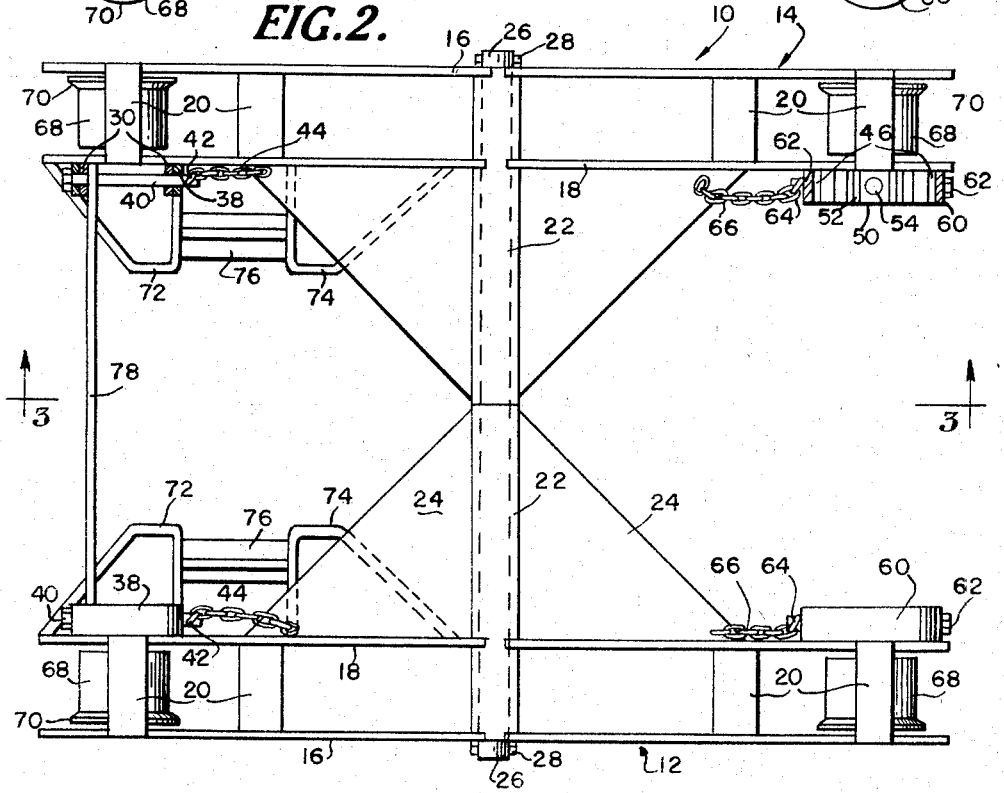
Figure 2 is a top plan view of the device with certain parts broken away for purposes of clearer illustration.
Figure 3:
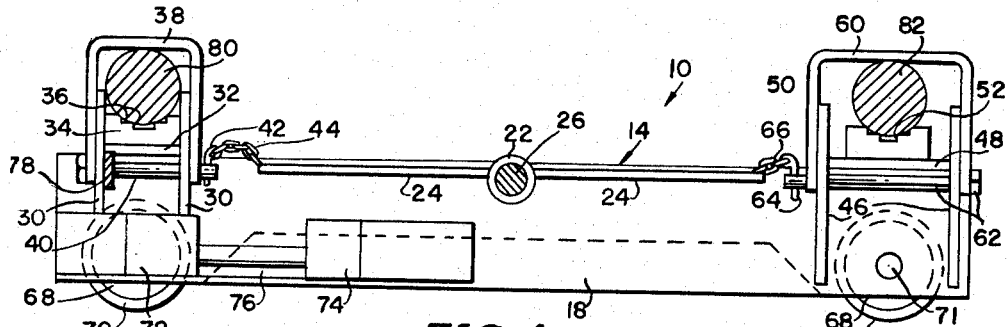
Figure 3 is a cross-sectional view taken along the line 3—3 of Figure 2 and illustrating the device attached to the tandem axles of a trailer.
Figure 4:
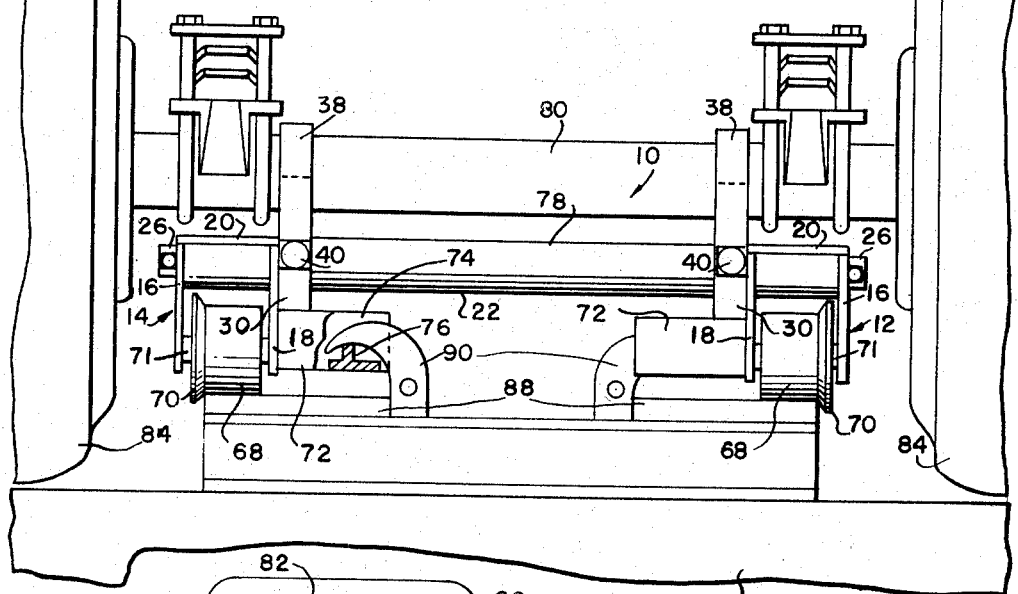
Figure 4 is a fragmentary rear view of the tandem axles of a trailer showing the manner in which the device of the present invention is utilized to secure the tandem axles to a flat railroad car.
Figure 5:
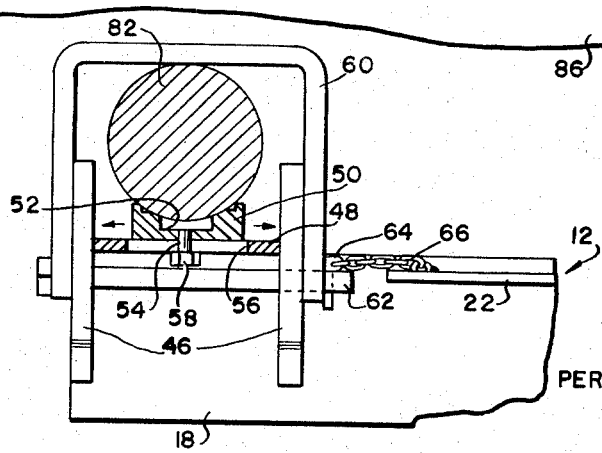
Figure 5 is an enlarged fragmentary cross-sectional view illustrating a detail of construction of the device.

As best shown in Figures 3 and 4, the present device is adapted to be attached to a trailer having rear tandem axles 80 and 82 provided with suitable wheels 84 to facilitate the mounting of the trailer on a flat railroad car 86 having wheel-receiving tracks 88 mounted on the upper flat surface thereof and suitable means, such as hooks 90, for the purpose of rigidly securing the trailer thereon. The present device is readily secured to the tandem axles 80 and 82 of the trailer by moving the interconnected side frames beneath the rear axles and, subsequently, jacking up the entire device into a position wherein the blocks 34 and 50 receive the respective front and rear axles. The U-shaped clamp members 38 and 60 are then dropped over the upper surface of the axles and the associated pins 40 and 62 inserted through the registering apertures in the associated clamp members and lugs. The pins may be secured in position by inserting the associated locking pins 42 and 64 in the ends thereof. In this regard, connecting bar 78 is mounted in the position shown in Figures 2 and 4 when the associated pins 40 are inserted in operative position.

It will be noted that the provision of relative pivotal movement about a horizontal transverse axis intermediate the ends of the side frames enables the axles 80 and 82 of the trailer to have independent movement in their normal way with the device secured thereto. The connecting bar 78 is loosely or yieldably connected sufficient to enable this action to take place.

In the normal operation of the present device, the attachment is secured to the trailer at a position remote from the flat car 86 upon which the same is to be mounted. Thus, during the transportation of the trailer to the flat railroad car with the device attached to the tandem rear axles thereof, free independent action of the rear axles in the normal manner can take place due to the pivotal arrangement of the present device. Another significant feature of the present device is that the axle-receiving blocks are arranged to accommodate a great variation in the sizes and shapes of the tandem axles provided on different trailers. The stepped notches readily receive not only round axles, as illustrated in the drawings, but also axles of I-beam configuration in cross-section as well as other shapes. The longitudinal adjustment of the forward axle-receiving block 50 serves to accommodate various spacings between different tandem axles. To this end, it is noted that the clamp members 60 utilized in conjunction with the blocks 50 are considerably wider than the clamp members 38 cooperating with the fixed blocks 34 to accommodate the adjustment.

When the trailer is moved onto the flat car, ramp-type tracks are provided for directing the wheels 68 onto the tracks 88 of the flat car. As the wheels move over the ramp-type tracks, the connecting bar 78 tends to equalize forces on the side frames so that when the tracks 88 of the flat railroad cars are engaged by the wheels, the wheels 84 of the tandem axles will be disposed above the surface of the flat car and the support of the trailer body is transferred to the wheels of the device.

While any suitable arrangement may be utilized for rigidly securing the device on the flat railroad car, one arrangement is shown in the drawings as embodying a pair of pivoted securing hooks 90 arranged to engage the bars 76. As best shown in Figure 4, with the wheels of the device 68 in engagement with the tracks 88 and the securing hooks 90 in engagement with the bars 70 and the device attached to the rear axles of the trailer, the latter is rigidly secured to the flat car so that it may be transported thereon. Upon arrival at the destination, the above procedure is carried out in reverse and at a suitable attaching station, the device may be removed from the tandem axles of the trailer. It is contemplated that the connecting bar 78 is loosely or yieldably connected between the side frame so that relative pivotal movement between the same is readily accommodated. However, the connecting bar has a tendency to equalize the forces applied to the side frames when there is a sufficient variance therebetween. If it is desired to leave the device secured to the trailer during normal use for an extended period of time, it is preferable to remove the connecting bar 78.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. For use with a trailer having tandem rear axles and wheels carried thereby, a device for detachable securement to said rear axles for mounting and securing the trailer on a flat railroad car having tracks thereon, said device comprising a pair of longitudinally extending frames, means connecting said frames together in transversely spaced relation for pivotal movement with respect to each other about a horizontal transversely extending axis disposed intermediate the ends of said frames, said frame connecting means comprising a pair of aligned transversely extending tubes rigidly secured to said frames and a shaft mounted within said tubes, means on the ends of said frames for detachably securing the same to the ends of said tandem axles in a position therebelow, and wheel means carried by the ends of each frame having lower peripheries disposed below said frames and in a position above the lower peripheries of the rear axle wheels of said trailer.

2. A device as defined in claim 1 wherein each of said frames includes a longitudinal plate and wherein each of said tubes has a pair of horizontal triangular-shaped gusset plates rigidly secured thereto and to the associated frame plate.

3. A device for attachment to the tandem rear axles of a trailer for use in mounting and securing the trailer on a flat railroad car having tracks thereon comprising a pair of side frames connected together for pivotal movement with respect to each other about a generally centrally disposed transversely extending horizontal axis, means on the ends of said side frames for detachably securing the same to the ends of the tandem rear axles of a trailer, and wheel means on the ends of each side frame arranged to have their lower peripheries disposed above the lower peripheries of the tandem axle wheels when the side frames are secured to the tandem axles of the trailer.

4. A device as defined in claim 3 wherein each axle securing means at one end comprises a pair of longitudinally spaced upstanding apertured lugs, an axle receiving block between said lugs, an inverted U-shaped clamp member having apertured legs disposed adjacent said apertured lugs, and a pin extending through the apertured lugs and clamp member legs.

5. A device as defined in claim 4 wherein said block is mounted for longitudinal adjustment between said lugs for receiving tandem axles of various spacings.

6. A device as defined in claim 4 wherein said block includes stepped notches formed in its upper surface for receiving axles of various shapes.

7. A device as defined in claim 3 wherein means is provided for fixedly securing the device to the railroad car, said securing means comprising a pair of longitudinally spaced bent straps rigidly secured to each side frame and extending inwardly therefrom, and a horizontal longitudinally extending bar rigidly secured between each pair of straps for engagement by anchoring means on the railroad car.

8. In combination with a trailer having tandem rear axles and wheels carried thereby, a device for detachable securement to said rear axles for mounting and securing the trailer on a flat railroad car having tracks thereon, said device comprising a pair of longitudinally extending frames, means connecting said frames together in transversely spaced relation for pivotal movement with respect to each other about a horizontal transversely extending axis disposed intermediate the ends of said frames, means on the ends of said frames for detachably securing the same to the ends of said tandem axles in a position therebelow, and wheel means carried by the ends of each frame having lower peripheries disposed below said frames and in a position above the lower peripheries of the rear axle wheels of said trailer.

References Cited in the file of this patent

UNITED STATES PATENTS

| | | |
|---|---|---|
| 1,241,418 | Mosher | Sept. 25, 1917 |
| 1,986,120 | Sanford | Jan. 1, 1935 |
| 1,994,815 | Ferrin | Mar. 19, 1935 |
| 2,439,801 | Flowers | Apr. 20, 1948 |
| 2,620,742 | Watter | Dec. 9, 1952 |
| 2,707,443 | Pope et al. | May 3, 1955 |

FOREIGN PATENTS

| | | |
|---|---|---|
| 195,611 | Great Britain | Mar. 13, 1923 |
| 688,088 | Great Britain | Feb. 25, 1953 |